Jan. 7, 1969  C. G. BURTON  3,419,998
GRAPE TRELLIS
Filed Nov. 25, 1966
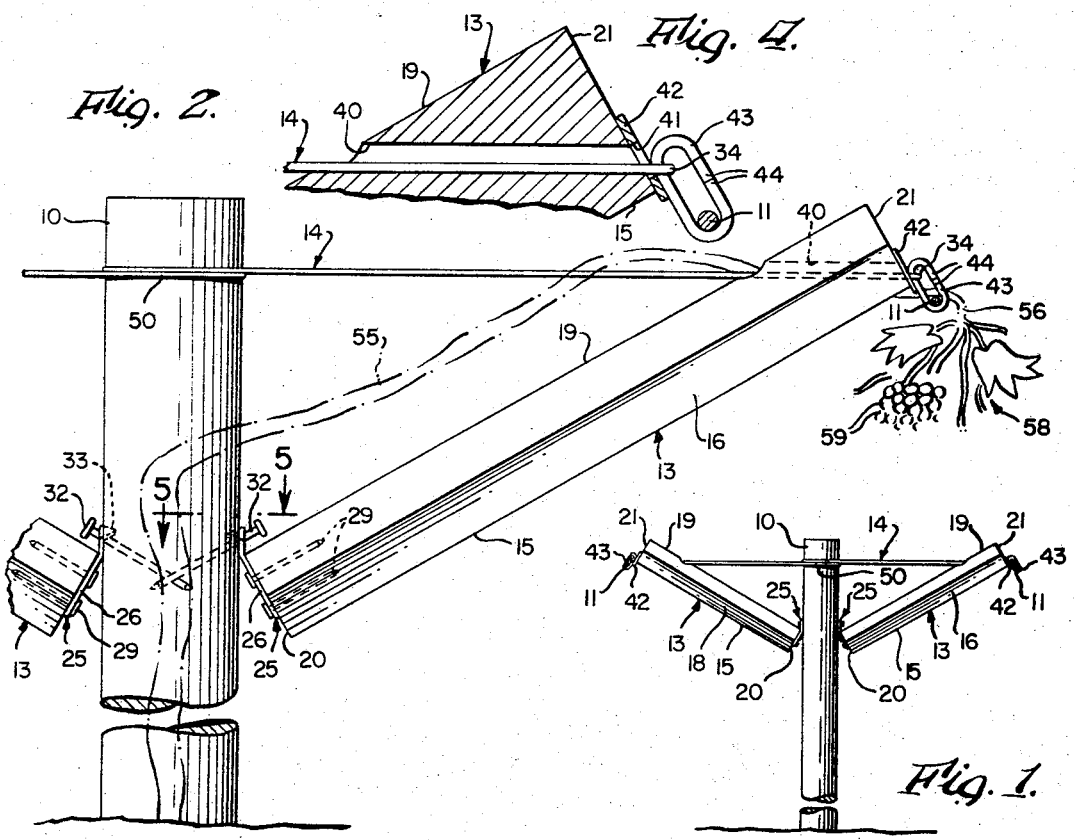
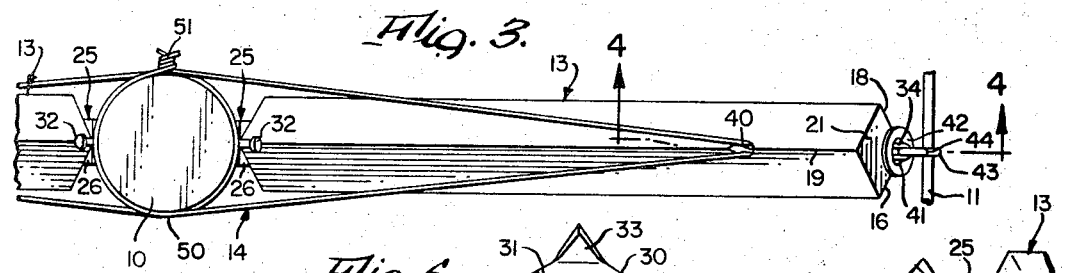
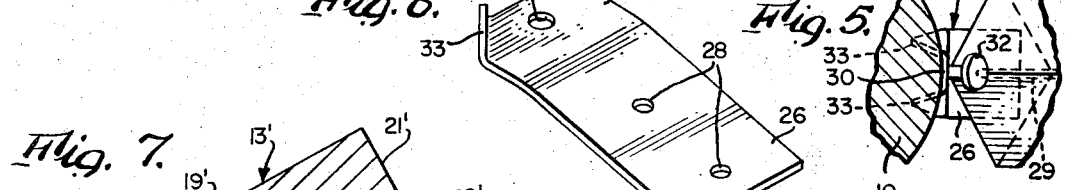
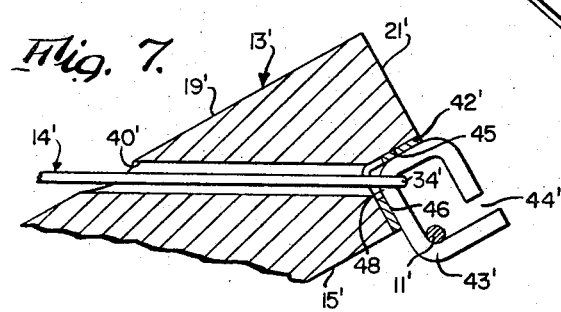
INVENTOR.
Charles G. Burton
BY
Popp and Sommer
ATTORNEYS 3,419,998
GRAPE TRELLIS
Charles G. Burton, Lewiston, N.Y., assignor to Chisholm-Ryder Company, Inc., Niagara Falls, N.Y., a corporation of New York
Filed Nov. 25, 1966, Ser. No. 597,070
U.S. Cl. 47—46
Int. Cl. A01g *17/06*
7 Claims

ABSTRACT OF THE DISCLOSURE

Machine harvesting of grapes with the harvester of my copending application Ser. No. 449,974, filed Apr. 22, 1965, requires a trellis with a cantilevered longitudinal trellis wire. Simple upwardly and outwardly angled wooden arms are provided for this purpose with simple sheet metal plates provided with stabilizing spurs are nailed both to the posts and to the inboard ends of these bars. A simple attachment is provided between the outboard end of each bar and a transverse grape post wire. This latter connection can also be such that the longitudinal trellis wire can be lifted from the trellis.

---

The invention resides in such a wooden bar, preferably square in cross section and arranged on edge vertically, together with such an anchor plate nailed both to the post and to the inboard end of this arm and preferably provided with spurs to stabilize the same, the outboard end of each bar being supported by a cross wire in a bore through the bar and embracing a loop which can be opened, or is open, to permit the insertion and removal of the longitudinal trellis wire.

In the accompanying drawings FIG. 1 is a fragmentary vertical transverse cross section through such a trellis. FIG. 2 is a fragmentary view similar to FIG. 1 on an enlarged scale and showing a grape vine trained on the longitudinal trellis wire. FIG. 3 is a top plan view of the structure illustrated in FIG. 2. FIG. 4 is a further enlarged vertical fragmentary section taken on line 4—4, FIG. 3. FIG. 5 is a further enlarged fragmentary horizontal section taken on line 5—5, FIG. 2. FIG. 6 is a perspective view of the sheet metal anchor member or plate used in connecting the inboard end of each arm to its grape post. FIG. 7 is a view similar to FIG. 4 showing a modified form of the invention.

Wooden grape posts 10 are conventionally set into the ground in a row at suitable distances from one another to support generally horizontal longitudinal trellis wires 11 running along at least one side, preferably both sides as shown, of the line of the grape posts in horizontally spaced relation thereto. Each grape post 10 can be round, square or other form in cross section and usually has a maximum cross sectional dimension of from 3½ inches to 5 inches. Each longitudinal trellis wire 11 is supported in such horizontally spaced relation to each grape post 10 by a wooden cross arm indicated generally at 13 the outboard end of which is supported by a transverse grape post wire 14 anchored in any suitable manner at the top of grape post 10.

Each wooden cross arm 13 is preferably of nominal 2 by 2 inch cross section and is arranged on edge vertically so as to provide a downwardly directed edge 15 from which side bottom faces 16 and 18 diverge upwardly at a 90° included angle to each other. This arrangement is important in mechanical grape picking as hereinafter described. The upper edge of each wooden cross arm 13 is indicated at 19 and it is provided at its inner end with a square end face 20 and at its outer end with a square end face 21, both of which are preferably perpendicular to the sides of the cross arm.

Each wooden cross arm 13 is arranged in upwardly and outwardly angled cantilevered relation to its grape post 10 and its inboard end is secured to the side of its post 10 by means of a metal anchor member 25 which is in the form of a sheet metal plate having one flat body part 26 positioned against the end face 20 of the wooden cross bar and provided with a pair of nail holes 28 for a pair of nails 29 driven into the end 20 of the wooden cross bar 13 in vertically spaced relation to each other and to the bottom edge 15. Each plate also includes an upstanding ear 30 arranged at a slight obtuse included angle to its body part 26 and having a nail hole 31 through which a nail 32 is driven into the side of the post 10. Preferably the outboard corner extremities of each ear 30 are bent to provide integral spurs 33 which project in the direction to dig into the sides of the grape post 10 and stabilize the arm 13 as best shown in FIG. 5. A feature of the invention resides in the ear 30 projecting upwardly from its body part 26 and the nail 32 being above the inboard end of its wooden cross bar 13.

An end loop 34 of each transverse grape post wire 14 is threaded through a bore 40 extending horizontally through the outboard end of the wooden arm 13 from its top edge 19 to its end face 21, as best shown in FIG. 4. This end loop 34 extends through the opening 41 of a flat round metal washer 42 and thence loops around a metal link 43. This link can be in the form of the split link shown in FIGS. 1–3 the ends 44 of which can be spread apart to permit insertion and withdrawal of the longitudinal trellis wire 11 which extends through and is supported by the links 43.

Alternately, as shown in FIG. 7, the round washer 42' can be formed to be of right angle channel form and set into a conforming recess 45 in the end 21' of the wooden cross bar 13' in line with its through bore 40'. The channel shaped seat 46 provided by this bent washer 41' can seat a one corner 48 generally rectangular loop 43' containing the main longitudinal trellis wire 11 and the ends of which are spread apart, as indicated at 44' so that the longitudinal trellis wire 11 can be conveniently lifted out of the metal loop 43' as may be desired. In other respects the modification illustrated in FIG. 7 is the same as in the preceding figures and the same reference numerals have been used.

Preferably one transverse grape post wire 14 serves two diametrically opposite wooden cross arms 13 and its ends are wound around the top of the grape post 10, as indicated at 50 and twisted together as indicated at 51.

The trunks or cordons 55 of the grape vines are usually located between posts 10 in spaced relation thereto and to each other and are usually trained upwardly and then horizontally to the longitudinal trellis wire 11 where its canes 56 are trained along this wire to form a hanging curtain 58 bearing fruit 59.

The trellis is particularly adapted for use with the mechanical grape harvester such as described in my said copending application 449,974. This grape harvester has a hub freely rotatable about an upright axis and which carries radially projecting arms which walk through the curtain 58 of canes 56 from the outside thereof in engagement with the underside of the longitudinal trellis wire 11. This hub is shaken up and down so that its arms so in engagement with the underside of the longitudinal trellis wire 11 shake the curtain 58 of canes so as to shake the fruit 59 loose therefrom.

With such a mechanical shaker in engagement with the underside of the wire, when the radial arms of the shaker approach the wooden cross arms 13 of the trellis they tend to lift the outboard ends of these arms. Such lifting is permitted by the post nails 32 which are simply pulled part way out of the posts 10, as shown in FIGS. 2 and 3, so as to provide a fulcrum for the inboard ends of the wooden arms 13. At the same time the integral side spurs 33 tend to prevent twisting or other displacement of its cantilevered arm 13 so that each cantilevered wooden arm 13 maintains the relationship to its post shown, with its row of nails 32 and 29 in a vertical plane and with its faces 16 and 18 in downwardly convergent relation to each other. This latter is important since the arms of the freely rotatable hub of the mechanical grape harvester initially come into contact with one or the other of these faces thereby serving only to lift the wooden cross arm 13 and to pass under each cross arm with ease and without injuring the cross arm.

From the foregoing it will be seen that the present invention provides a very inexpensive and at the same time durable and long lived grape trellis for mechanical harvesting, such low cost being particularly important when it is considered that many acres of vineyard must have their grape posts 10 provided with cantilevered cross arms to enable such mechanical picking of grapes.

I claim:
1. A trellis having a row of posts set into the ground to support a generally horizontal longitudinal trellis wire arranged along at least one side of the upper ends of said row of posts in transversely spaced relation thereto, wherein the improvement comprises wooden arms each having its outboard end arranged adjacent said trellis wire and its inboard end arranged at a lower elevation adjacent the opposing side of a corresponding post, a metal anchor member having a first part arranged against a face at said inboard end of said arm and a second part arranged against said opposing side of said post and extending upwardly from said inboard end and having a hole therethrough adjacent its upper end, a first nail means extending through said first part of said metal anchor member into said arm, a second nail extending through said hole of said second part of said anchor member into said post, and a transverse grape post wire connecting the outboard end of said wooden arm to the top of said post, whereby said second nail can act as a fulcrum to permit upward movement of said outboard end.

2. A trellis as set forth in claim 1 wherein said face at the inboard end of said wooden arm is the inboard end face thereof with said first nail means extending into said arm lengthwise thereof.

3. A trellis as set forth in claim 2 wherein said first nail means comprises a pair of spaced nails arranged substantially in the same vertical plane as said second nail.

4. A trellis as set forth in claim 2 wherein said second part of said anchor member is provided with spurs directed to enter said opposing side of said post and which serve to reposition the wooden arm in the same relation to said post following such upward movement of the outboard end thereof.

5. A trellis as set forth in claim 4 wherein said spurs comprise edge portions at the outer corners of said second part of said anchor member.

6. A trellis having a row of posts set into the ground to support a generally horizontal longitudinal trellis wire arranged along at least one side of the upper ends of said row of posts in transversely spaced relation thereto, wherein the improvement comprises wooden arms each having its outboard end arranged with an end face adjacent the trellis wire and its inboard end arranged at a lower elevation adjacent the opposing side of a corresponding post, said wooden arm being provided with a bore which extends from its said end face toward said upper end of said post, a transverse post wire secured to the upper end of said post and extending outwardly through said bore, a metal loop embraced by and held against said end face by said transverse post wire and surrounding and supporting said longitudinal trellis wire, and a metal washer interposed between said end face and said loop and through which said transverse post wire also extends.

7. A trellis as set forth in claim 6 wherein said washer is of channel form in vertical cross section and is set into a horizontal groove of corresponding form in said end face of said wooden arm and wherein one side of said loop conforms to and fits into the concave side of said washer and has spaced apart ends at its opposite side to permit said longitudinal trellis wire to be lifted directly out of and reinserted into said loop.

References Cited

UNITED STATES PATENTS

| | | | |
|---|---|---|---|
| 542,821 | 7/1895 | Broughton et al. | 47—44 |
| 941,894 | 11/1909 | Stetson | 47—46 |
| 2,275,282 | 3/1942 | Bigham | 248—42 |
| 2,914,278 | 11/1959 | Burke | 248—42 |
| 2,941,767 | 6/1960 | Mogey | 248—42 |
| 3,337,988 | 8/1967 | Burton | 47—46 |

ROBERT E. BAGWILL, *Primary Examiner.*

U.S. Cl. X.R.

248—42, 221